United States Patent
Lepe et al.

(10) Patent No.: US 9,912,039 B2
(45) Date of Patent: Mar. 6, 2018

(54) WIRELESS COMMUNICATION DEVICE AND ANTENNA ASSEMBLY

(71) Applicant: TYCO ELECTRONICS CORPORATION, Berwyn, PA (US)

(72) Inventors: Hilario Lepe, Gilroy, CA (US); Bruce Foster Bishop, Aptos, CA (US); Junwon Kim, Capitola, CA (US)

(73) Assignee: TE Connectivity Corporation, Berwyn, PA (US)

( * ) Notice: Subject to any disclaimer, the term of this patent is extended or adjusted under 35 U.S.C. 154(b) by 118 days.

(21) Appl. No.: 14/921,001

(22) Filed: Oct. 23, 2015

(65) Prior Publication Data

US 2017/0117611 A1    Apr. 27, 2017

(51) Int. Cl.
| | |
|---|---|
| *H01Q 13/12* | (2006.01) |
| *H01Q 13/18* | (2006.01) |
| *H01Q 1/24* | (2006.01) |
| *G06F 1/16* | (2006.01) |
| *H01Q 13/10* | (2006.01) |
| *H01Q 1/22* | (2006.01) |
| *H01Q 21/28* | (2006.01) |

(52) U.S. Cl.
CPC ............ *H01Q 1/24* (2013.01); *G06F 1/1618* (2013.01); *G06F 1/1633* (2013.01); *G06F 1/1681* (2013.01); *G06F 1/1696* (2013.01); *H01Q 1/2266* (2013.01); *H01Q 1/241* (2013.01); *H01Q 1/243* (2013.01); *H01Q 13/10* (2013.01); *H01Q 21/28* (2013.01)

(58) Field of Classification Search
CPC .......... H01Q 1/24; H01Q 1/241; H01Q 1/243; H01Q 13/10; H01Q 13/12; H01Q 13/18
See application file for complete search history.

(56) References Cited

U.S. PATENT DOCUMENTS

| | | | |
|---|---|---|---|
| 6,429,819 | B1 | 8/2002 | Bishop et al. |
| 6,697,022 | B2 | 2/2004 | Ponce De Leon et al. |
| 7,209,084 | B2 | 4/2007 | Lindell |
| 8,294,620 | B2 | 10/2012 | Flint et al. |
| 8,665,170 | B2 | 3/2014 | Bishop et al. |
| 2008/0062058 | A1 | 3/2008 | Bishop |
| 2013/0271330 | A1 | 10/2013 | Bishop et al. |
| 2014/0240177 | A1 | 8/2014 | Wang et al. |
| 2014/0361932 | A1* | 12/2014 | Irci ........................ H01Q 1/243 343/702 |

* cited by examiner

*Primary Examiner* — Hoang Nguyen

(57) ABSTRACT

Wireless communication device includes a first device section. The first device section has a first edge. The wireless communication device also includes a second device section that has a second edge. The wireless communication device also includes a floating hinge that joins the first and second edges and permits the first and second device sections to move between a closed state and an operating state. The floating hinge and the first device section are rotatable about a first axis of rotation that extends through the floating hinge. The floating hinge and the second device section are rotatable about a second axis of rotation that extends through the floating hinge. The floating hinge includes a slot antenna that is communicatively coupled to a processor and is configured to at least one of transmit wireless signals or receive wireless signals.

20 Claims, 7 Drawing Sheets

WIRELESS COMMUNICATION DEVICE AND ANTENNA ASSEMBLY

BACKGROUND

The subject matter relates generally to wireless communication devices and to antenna assemblies that may be used by wireless communication devices.

Wireless communication devices are increasingly used by consumers and have an expanding number of applications within a variety of industries. Examples of such wireless devices include mobile phones, tablet computers, notebook computers, laptop computers, and handsets. These devices often include one or more integrated antennas that allow for wireless communication within a communication network. Recently, there have been two conflicting market demands for wireless devices. Users generally demand wireless devices that are smaller or weigh less, but the users also desire better performances and/or a greater number of capabilities. For example, wireless devices now operate within multiple frequency bands and are capable of selecting such bands for different networks. Features that have improved recently include data storage, battery life, and camera performance, among other things.

To provide smaller devices with improved performances and more capabilities, manufacturers have attempted to optimize the available space within the wireless device by resizing components of the wireless device or by moving the components to different locations. For example, the size and shape of the antenna may be reconfigured and/or the antenna may be moved to a different location. The number of available locations for an antenna, however, is limited by government regulations (e.g., restrictions on specific absorption rate (SAR)) and the requirements of other components in the wireless device.

With respect to portable computers, such as laptops and notebooks, antennas are positioned either within the movable section of the computer that includes a display or the base section that includes the keyboard. For example, an antenna may be located between the display and an edge or side of the movable section. Although these locations are suitable and allow for antennas that perform sufficiently, other possible locations for antennas are desired to provide more options in designing the wireless device. Alternative antenna configurations are also desired to provide a greater number of design choices.

BRIEF DESCRIPTION

In an embodiment, a wireless communication device is provided that includes a first device section having a processor and an input device that is operably connected to the processor. The input device is configured to receive inputs from a user. The first device section has a first edge. The wireless communication device also includes a second device section that has circuitry that is communicatively coupled to the processor. The second device section has a second edge. The wireless communication device also includes a floating hinge that joins the first and second edges and permits the first and second device sections to move between a closed state and an operating state. The floating hinge and the first device section are rotatable about a first axis of rotation that extends through the floating hinge. The floating hinge and the second device section are rotatable about a second axis of rotation that extends through the floating hinge. The floating hinge includes a slot antenna that is communicatively coupled to the processor and is configured to at least one of transmit wireless signals or receive wireless signals.

In an embodiment, an antenna assembly is provided that includes a conductive sheet that extends longitudinally along a central axis and is shaped to surround the central axis. The conductive sheet has an interior surface that faces the central axis and defines an antenna cavity. The conductive sheet includes a first slot that is configured to resonate at a designated frequency. The antenna assembly also includes a feed sub-assembly that is positioned within the antenna cavity and operably coupled to the first slot. The feed sub-assembly includes a conductive pathway that extends across the first slot. The conductive sheet also includes a second slot that is located generally opposite the first slot with the antenna cavity therebetween. Optionally, the second slot is sized and shaped relative to the first slot to improve transmission of the first slot. Optionally, the second slot is sized and shaped to transmit and/or receive wireless signals within a frequency band.

DETAILED DESCRIPTION

Embodiments set forth herein include wireless communication devices and antenna assemblies that may be used for wireless communication. A wireless communication device is hereinafter referred to as a wireless device. In some embodiments, an antenna assembly is integrated with a hinge assembly of the wireless device. The hinge assembly may movably couple different sections of the wireless device. For example, the hinge assembly may include a floating hinge that is capable of rotating about two separate axes and that joins two separate sections of the wireless device, such as the display section and the base section of a portable computer. As used herein, a "portable computer" includes a laptop computer, a notebook computer, and the like. In particular embodiments, the portable computer is capable of being converted into a tablet-like computer.

In other embodiments, the antenna assembly may have any position relative to the wireless device. In some embodiments, the antenna assembly is shaped to curve about a central axis. For example, the antenna assembly may include a slot antenna that has a closed polygonal or other closed cross-sectional shape (e.g., rectangular), circular, etc. that is taken perpendicular to the central axis. The slot antenna may define an antenna cavity that extends longitudinally along the central axis. The antenna assembly may include one or more slots. In particular embodiments, the antenna assembly includes a first slot and a second slot that are positioned generally opposite each other with the antenna cavity therebetween in order to isolate the first and second slot. In particular embodiments, one or more axles may extend through the antenna cavity and parallel to the central axis. The axle(s) may be used to form a hinge assembly that joins discrete sections of a wireless device.

In some embodiments, the antenna assemblies may function as a multi-band antenna that includes at least two frequency bands, such as 698-960 MHz and 1.71-2.17 GHz. Another example of a frequency band that may be used is 2.5-2.7 GHz. In other embodiments, the antenna assemblies may operate at about 2.4 GHz, 5.3 GHz, and/or 5.8 GHz. However, it should be understood that wireless devices and antenna assemblies described herein are not limited to particular frequency bands and other frequencies may be used.

Figure 1:
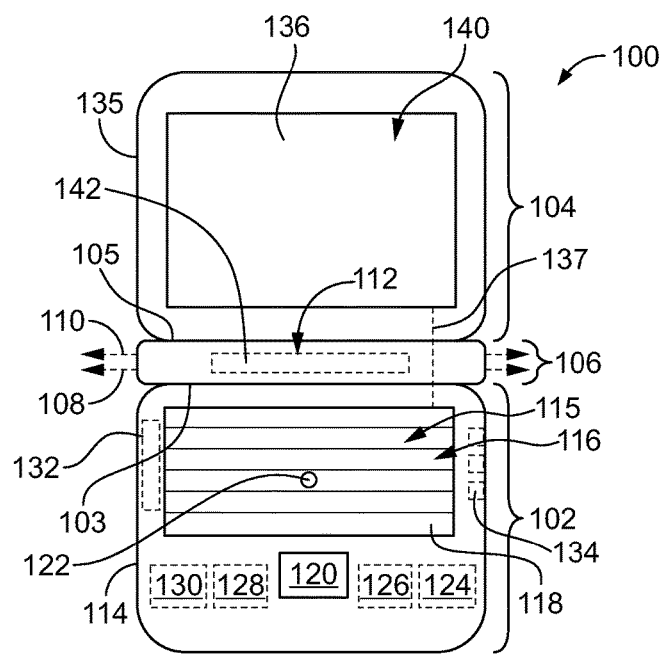
FIG. 1 is a schematic illustration of a wireless communication device formed in accordance with an embodiment.

FIG. 1 is a schematic illustration of a wireless communication device 100 formed in accordance with an embodiment. The wireless communication device 100 is hereinafter referred to as a wireless device. In an exemplary embodiment, the wireless communication device 100 is a convertible portable computer that is capable of being repositioned to operate in different modes or states. For example, the wireless device 100 may operate as a portable computer (e.g., laptop, notebook, and the like) in a first configuration and operate as a tablet computer in a second configuration. In other embodiments, however, the wireless device 100 may only have one configuration. For example, the wireless device 100 may only operate as a portable computer or only operate as a tablet computer.

The wireless device 100 may include multiple interconnected sections that are movable with respect to each other. In an exemplary embodiment, the wireless device 100 includes a first device section 102 and a second device section 104 that are interconnected to each other through a hinge assembly 106. The first device section 102 has a first edge 103, and the second device section has a second edge 105. The hinge assembly 106 may interconnect the first and second edges 103, 105 and permit the first and second device sections 102, 104 to move between a closed state and an operating state. In the illustrated embodiment, the hinge assembly 106 is a floating hinge that is capable of rotating about two axes of rotation. For example, the hinge assembly 106 may be rotatably coupled to the first device section 102 along a first axis of rotation 108 and rotatably coupled to the second device section 104 along a second axis of rotation 110. As such, the hinge assembly 106 and the first device section 102 are rotatable or pivotable about the first axis 108, and the hinge assembly 106 and the second device section 104 are rotatable or pivotable about the second axis 110. In particular embodiments, the hinge assembly 106 includes an integrated antenna assembly (or sub-assembly) 112. The antenna assembly 112 is movable with respect to the first device section 102 and the second device section 104.

It should be understood, however, that embodiments set forth herein are not limited to wireless devices having hinge assemblies with integrated antenna assemblies or to wireless devices with floating hinges. For example, the hinge assembly 106 may only have one axis of rotation. Yet in other embodiments, an antenna assembly, such as the antenna assembly 220 (shown in FIG. 3) or the antenna assembly 320 (shown in FIG. 7), may be positioned at another location within the wireless device.

The first device section 102 may include a base housing 114 having an interactive side 115 that includes a user interface 116. The user interface 116 may include one or more input devices. For example, the user interface 116 includes a keyboard 118, a touchpad 120, and a tracking button 122 that are communicatively coupled to the internal circuitry of the wireless device. Each of the keyboard 118, the touchpad 120, and the tracking button 122 is an input device that is configured to receive user inputs from a user of the wireless device 100.

The base housing 114 surrounds and protects at least some circuitry of the wireless device 100. For example, the internal circuitry may include a processor 124 (e.g., central processing unit), memory 126, internal storage 128 (e.g., hard drive or solid state drive), a power supply 130, and a cooling fan 132. The first device section 102 may also include a number of ports 134 that allow other devices or networks to communicatively couple to the wireless device 100. Non-limiting examples of external devices include removable media drives, external keyboards, a mouse, speakers, and cables (e.g., Ethernet cable). Although not shown, the first device section 102 may also be configured to be mounted to a docking station and/or charging station.

The second device section 104 includes a device housing 135 having an interactive side 140. The device housing 135 surrounds and protects at least some circuitry of the wireless device 100. For example, the second device section 104 includes a user display 136. The user display 136 is communicatively coupled to, for example, the processor 124 through circuitry (e.g., conductive pathways) 137. As used herein, the term "communicatively coupled" means coupled in a manner that allows direct or indirect communication of data signals between the two components that are communicatively coupled. For example, data signals may travel between the user display 136 and the processor 124 through the circuitry 137. However, the data signals may be processed or modified at some point between the user display 136 and the processor 124. Furthermore, two elements may be communicatively coupled through wires, wirelessly, or both.

In an exemplary embodiment, the user display 136 is a touchscreen that is capable of detecting a touch from a user and identifying a location of the touch within the display area. The touch may be from a user's finger and/or a stylus or other object. The user display 136 may implement one or more touchscreen technologies. For example, the user display 136 may include a resistive touchscreen having a plurality of layers, including electrically-resistive layers. The user display 136 may include a surface acoustic wave (SAW) touchscreen that utilizes ultrasonic waves for identifying touches. The user display 136 may also be a capacitive touchscreen based on one or more known technologies (e.g., surface capacitance, projected capacitive touch (PCT), mutual capacitance, or self-capacitance). The user display 136 may include an optical touchscreen that is based on optical technology (e.g., image sensors and light sources). Other examples of touchscreen technology may include acoustic pulse recognition touchscreens and dispersive signal technology. In other embodiments, however, the user display 136 is not a touchscreen that is capable of identifying touches. For example, the user display 136 may only be capable of displaying images.

Optionally, the second device section 104 may include additional components, such as one or more of the components located within the first device section 102. Although not shown, the second device section 104 may also include ports, speakers, integrated cameras, etc. It should be understood that the wireless device 100 is only described as one example and that embodiments may include other types of wireless devices. For example, the wireless device may be a flip phone.

The antenna assembly 112 is communicatively coupled to the processor 124. During operation of the wireless device 100, the wireless device 100 may communicate with external devices or networks through the antenna assembly 112. To this end, the antenna assembly 112 may include a slot antenna 142 that is configured to exhibit electromagnetic properties that are tailored for desired applications. For instance, the slot antenna 142 may be configured to operate in multiple frequency bands simultaneously. The structure of the slot antenna 142 can be configured to effectively operate in particular radio bands. The structure of the slot antenna 142 can be configured to remotely select specific radio bands for different networks. In some embodiments, the structure of the slot antenna 142 is configured to be disposed within the hinge assembly 106. In particular embodiments, the entire antenna assembly 112 is disposed within the hinge assembly 106. The antenna assembly 112 may be configured to have designated properties, such as a voltage standing wave ratio (VSWR), gain, bandwidth, and a radiation pattern of the antenna.

Figure 2:
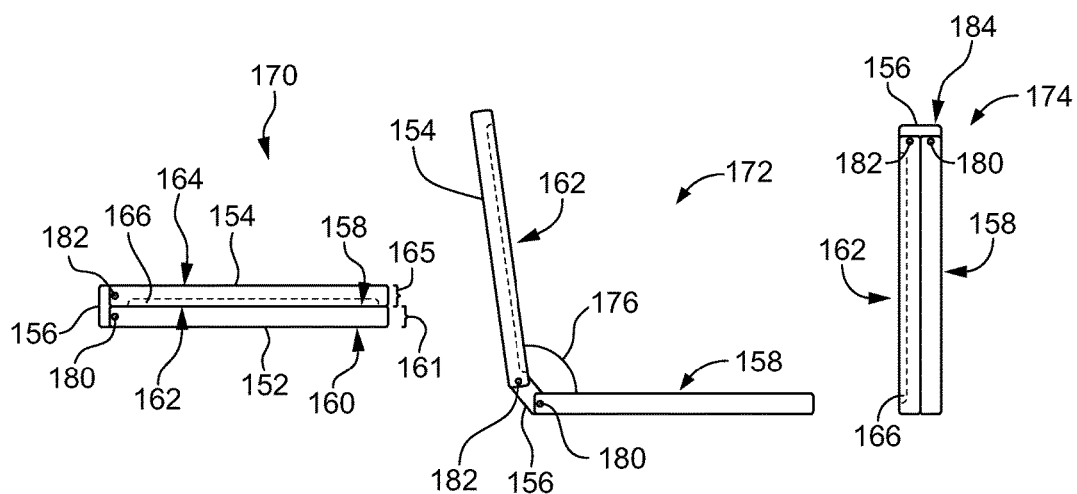
FIG. 2 shows three side views of a wireless communication device formed in accordance with an embodiment that illustrate three different states or modes of the wireless communication device.

FIG. 2 shows three side views of a wireless device 150 formed in accordance with an embodiment. More specifically, FIG. 2 shows the wireless device 150 in a closed state or mode 170, a first operating state or mode 172, and a second operating state or mode 174. The wireless device 150 may be similar or identical to the wireless device 100 (FIG. 1). With respect to the closed state 170, the wireless device 150 includes a first device section 152, a second device section 154, and a hinge assembly 156 that movably couples the first and second device sections 152, 154. The first device section 152 includes an interactive side 158 and a housing side 160. The interactive side 158 and the housing side 160 face in opposite directions with a thickness 161 of the first device section 152 extending therebetween. The interactive side 158 is configured to receive user inputs and/or provide outputs to the user. The outputs may be in the form of audio signals (or sound) or video signals (or images). The interactive side 158 may include one or more input devices, such as a keyboard, touchpad, and/or tracking button (not shown).

The second device section 154 may include an interactive side 162 and a housing side 164. The interactive side 162 and the housing side 164 face in opposite directions with a thickness 165 of the second device section 154 extending therebetween. The interactive side 162 includes a user display 166. The interactive side 162 may also include other components for receiving user inputs or providing outputs to a user.

In the closed state 170, the first and second device sections 152, 154 are positioned side-by-side. For example, the interactive sides 158, 162 may engage each other and/or have a nominal gap therebetween. The housing sides 160, 164 constitute exterior sides of the wireless device 100 when the wireless device 100 is in the closed state 170. It is noted that the wireless device 150 may still be operative in the closed state. For example, an external device (e.g., display, speakers, etc.) (not shown) may be connected to the wireless device 150 through a universal serial bus (USB) port. The external device may be controlled by the wireless device 150 while the wireless device 150 is in the closed state.

In the first operating state 172, the interactive sides 158, 162 define a non-orthogonal angle 176. The angle 176 is generally between 80°-150° during operation, but is not necessarily limited to this range. It should be understood that the first operating state is not limited to a single angle 176. For example, the angle 176 in the first operating state 172 may be any angle within a designated range of angles, such as greater than 60°. In the first operating state 172, the input devices (e.g., keyboard, touchpad, or tracking button) are active such that the input devices may be responsive to actions by the user. The first operating state 172 may be referred to as the computer mode, wherein the wireless device 100 functions in a similar manner as a conventional portable computer.

The hinge assembly 106 permits the first and second device sections 152, 154 to be folded from the first operating state 172 to the second operating state 174. In the second operating state 174, the first and second device sections 152, 154 are positioned side-by-side and the interactive sides 158, 162 face in opposite directions. The interactive sides 158, 162 may constitute exterior sides of the wireless device 100. As such, the user display 166 may be exposed to an exterior of the wireless device 100. The second operating state 174 may be referred to as the tablet mode, wherein the wireless device 100 functions in a similar manner as a conventional tablet computer. For example, the user display 166 may be a touchscreen that is configured to receive touches from a user of the wireless device 100. In the second operating state 174, the hinge assembly 156 may form or become a device edge 184 of the wireless device 100 that is configured to be gripped by a user. In some embodiments, the hinge assembly 156 includes at least some exposed metal. For example, the hinge assembly 156 may include a dielectric coating or layer that only partially covers the metal of the antenna. Alternatively, the hinge assembly 156 may be devoid of a dielectric coating or layer.

In some embodiments, the input device(s) along the interactive side 158 may be inactive in the second operating state 174 such that the input devices may not be responsive to actions by the user. For example, the wireless device 100 may have one or more sensors that indicate the wireless device 100 is in the second operating state 174. The processor 124 may receive this information and deactivate the input devices. In other embodiments, however, the input devices along the interactive side 158 may be active in the second operating state 174.

As the wireless device 100 transitions between the different states, the hinge assembly 156 may move relative to the first device section 152 and/or the second device section 154. By way of illustration, the hinge assembly 156 may rotate about first and second axes of rotation 180, 182 as the second device section 154 is moved from the closed state 170 to the first operating state 172. As the second device section 154 transitions from the first operating state 172 to the second operating state 174, the hinge assembly 156 may rotate about the first and second axes 180, 182. As described herein, the hinge assembly 156 may include an integrated antenna assembly. The antenna assembly may move relative to the first device section 152 and/or the second device section 154 as the wireless device 100 moves between the different states. In some embodiments, the antenna assembly may have different orientations within the hinge assembly 156 when in the different states. More specifically, the antenna assembly may have different radiation patterns in the different states.

Figure 3:
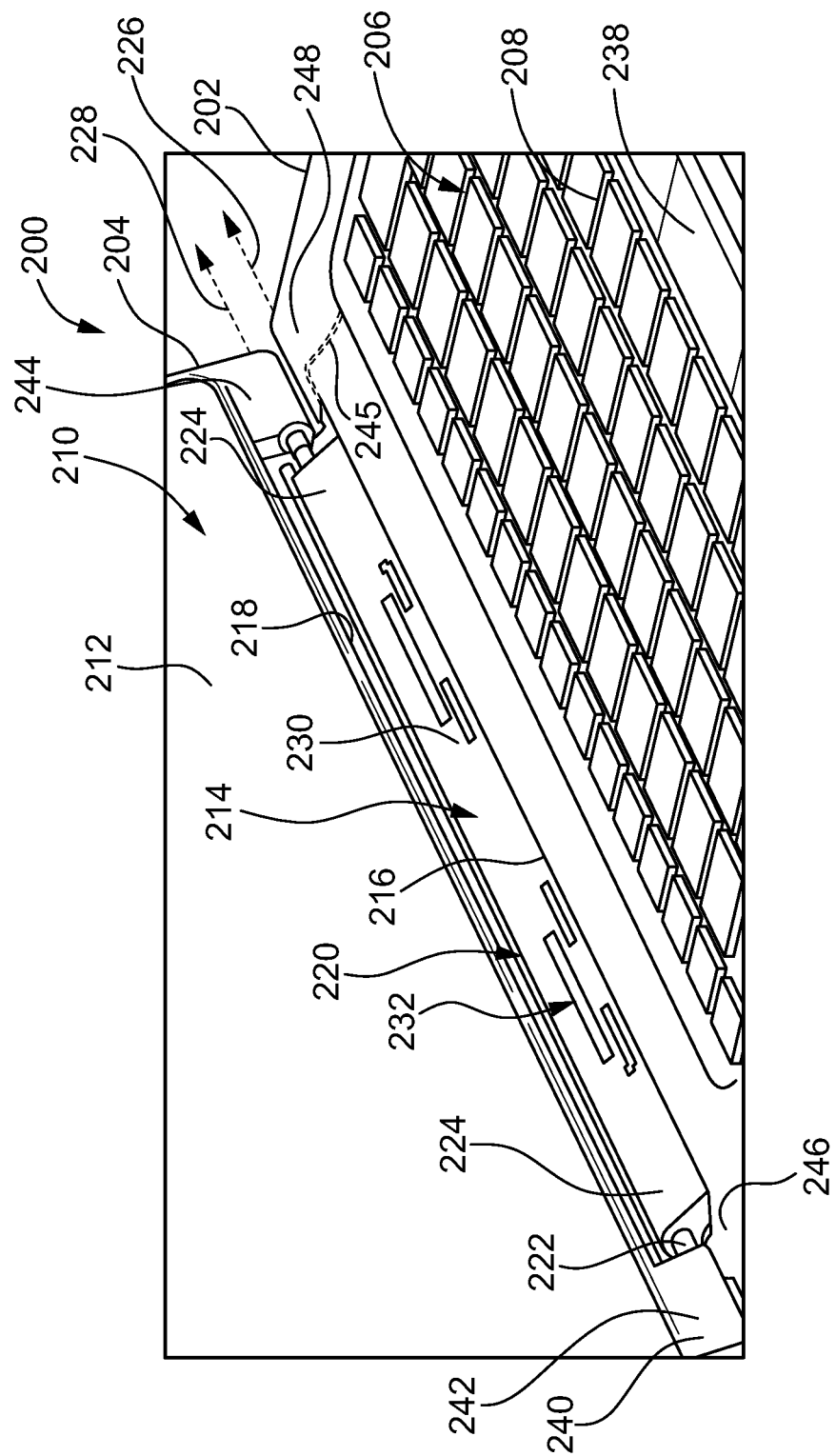
FIG. 3 is an enlarged perspective view of a wireless communication device formed in accordance with an embodiment that includes a hinge assembly.

FIG. 3 is an enlarged perspective view of a portion of a wireless device 200 formed in accordance with an embodiment. In the illustrated embodiment, the wireless device 200 is a portable computer, but other wireless devices may include the features described herein. The wireless device 200 may include at least some of the components described in FIGS. 1 and 2 with respect to the wireless devices 100, 150, respectively. For example, the wireless device 200 includes a first device section 202 and a second device section 204. The first device section 202 has an interactive side 206 that includes a keyboard 208. The second device section 204 has an interactive side 210 that includes a display 212. The display 212 may be a touchscreen.

The wireless device 200 also includes a hinge assembly 214 that joins the first and second device sections 202, 204 and permits the first and second device sections 202, 204 to move between an operating state, as shown in FIG. 3, and a closed state (not shown). The first device section 202 includes a first edge 216, and the second device section 204 includes a second edge 218. In the illustrated embodiment, the hinge assembly 214 includes an antenna assembly 220, axles 222, and hinge supports 224. In FIG. 3, only one axle 222 is shown and has an axis of rotation 228 extending therethrough. However, the hinge assembly 214 includes another axle 222 that has an axis of rotation 226 extending therethrough. The hinge assembly 214 may also be referred to as a floating hinge.

The hinge supports 224 may comprise a thermoplastic material (or other moldable material) that surrounds the axles 222. The hinge supports 224 may hold the axles 222 in fixed positions with respect to each other. As used herein, axles may be in fixed positions relative to each other or other components when rotating about an axis that extends through the axle. For example, the axle 222 may rotate when the second device section 204 is rotated but maintain its relative position with respect to the antenna assembly 220. In other embodiments, one or more of the axles 222 do not rotate when the corresponding device section is moved.

The antenna assembly 220 is coupled to the hinge supports 224. The antenna assembly 220 includes a slot antenna 230 having one or more slots 232 that are sized and shaped to resonate at a designated frequency. The slot antenna 230 may have a fixed position relative to the hinge supports 224 and the axles 222. The antenna assembly 220 may also include one or more feed sub-assemblies 234, 236 (shown in FIG. 5) that are operably coupled to the slot antenna 230. In an exemplary embodiment, the antenna assembly 220 is integrated with the hinge assembly 214 such that the antenna assembly 220 moves with the other elements of the hinge assembly 214. For example, the antenna assembly 220, including the slot antenna 230 and the feed sub-assemblies 234, 236, may have a fixed position relative to the hinge supports 224 and the axles 222.

In addition to electromagnetic properties, the slot antenna 230 may be configured to enhance a stiffness or rigidity of the hinge assembly 214 (FIG. 3). For example, the slot antenna 230 has a non-planar shape that includes an antenna section 258 and leg sections 260, 262. The antenna section 258 is oriented perpendicular to the leg sections 260, 262. The non-planar shape of the hinge assembly 214 may prevent bending of the hinge assembly 214. In the illustrated embodiment, the slot antenna 230 has two leg sections 260, 262 and one antenna section 258. In other embodiments, the slot antenna 230 may have only one leg section or more than two leg sections and/or may have more than one antenna section. The conductive sheet 250 may be stamped and formed (e.g., folded or bent) to achieve the designated shape.

The first and second device sections 202, 204 include first and second housings 238, 240. The first and second housings 238, 240 are configured to be operably coupled to respective axles. For example, the second housing 240 includes barrel extensions 242, 244 that receive opposite ends of the axle 222. The first housing 238 may also include barrel extensions 246, 248 that receive opposite ends of the corresponding axle 222.

In an exemplary embodiment, the axles 222 are elongated rods that extend continuously along the corresponding axes 226, 228. In other embodiments, however, each of the axles may include two separate axle segments that are aligned with each other along the corresponding axis. For example, a first axle segment may be received by the barrel extension 242 and a second axle segment may be received by the barrel extension 244. The first and second axle segments may be aligned along the second axis 228. The axle segments may be, for example, molded portions of the hinge supports 224. In other embodiments, the axle segments may be metal rods that are inserted into the hinge supports 224.

One or more communication lines 245 (dashed lines) of the antenna assembly 220 electrically couple the slot antenna 230 to, for example, a transmitter/receiver (not shown) that encodes signals from the feed sub-assemblies 234, 236 or decodes signals received from a wireless network. The communication line 245 may extend through a corresponding axle 222 or immediately adjacent to the corresponding axle 222.

Figure 4:
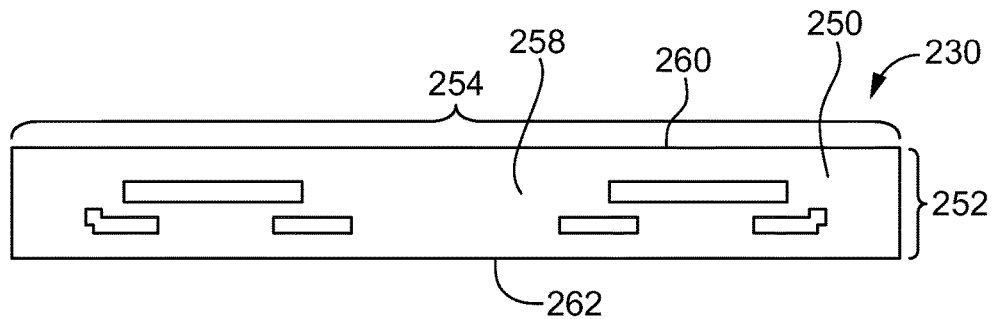
FIG. 4 is a top view of a slot antenna that may be integrated with the hinge assembly of FIG. 3.
Figure 5:
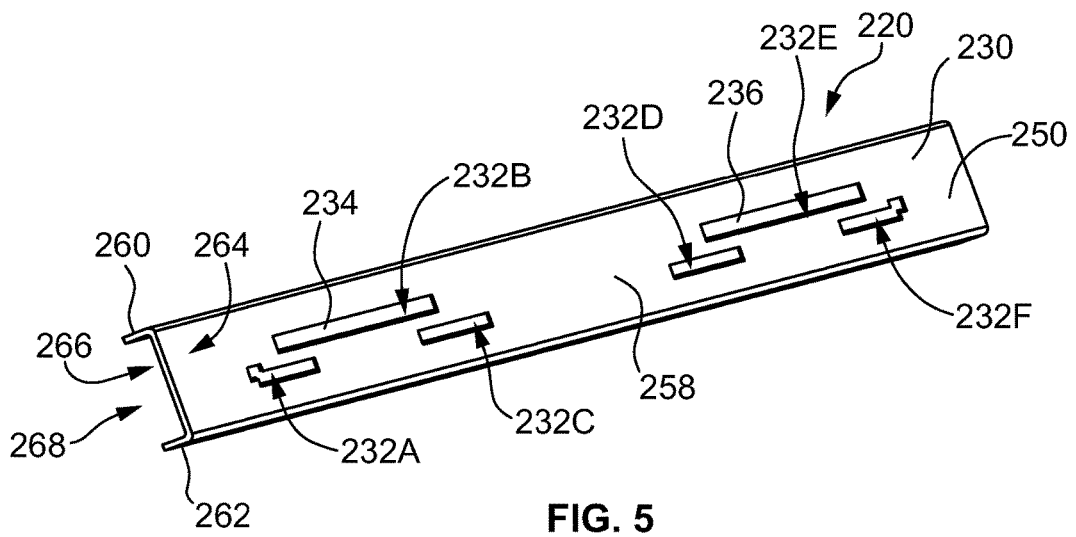
FIG. 5 is a top perspective view of an antenna assembly that includes the slot antenna of FIG. 4.
Figure 6:
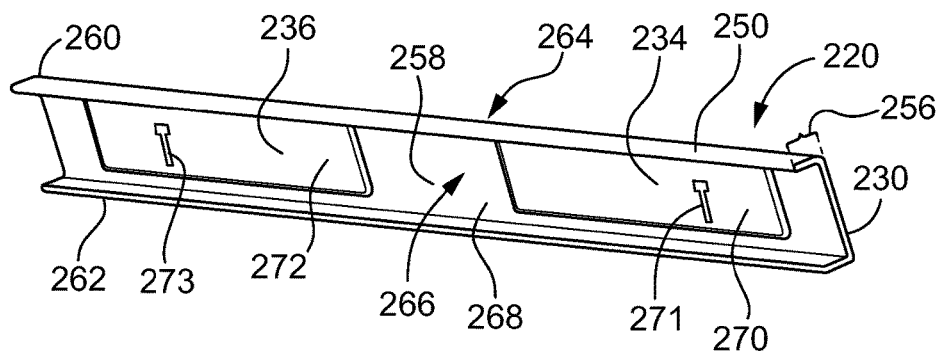
FIG. 6 is a bottom perspective view of the antenna assembly of FIG. 5.

FIG. 4 is a top view of the slot antenna 230, and FIGS. 5 and 6 are top and bottom perspective views, respectively, of the antenna assembly 220 that include the slot antenna 230. The slot antenna 230 includes a conductive sheet 250 that is sized and shaped in a designated manner to provide a desired performance. For example, the slot antenna 230 has a designated width 252 (FIG. 4), length 254 (FIG. 4), and height 256 (FIG. 6). The conductive sheet 250 may comprise a metal, such as aluminum. The width 252, the length 254, and the height 256 may be configured such that the slot antenna 230 has designated electromagnetic properties. By way of example, the width 252 may be between 9 and 14 millimeters (mm), the length 254 may be between 180 and 240 mm, and the height 256 may be between 2 and 10 mm. However, embodiments set forth herein are not limited to these value ranges. In the illustrated embodiment, the width 252, the length 242, and the height 256 are essentially uniform throughout the slot antenna 230. In other embodiments, however, one or more of the dimensions may not be uniform. For example, a portion of the slot antenna may have a longer length than another portion of the slot antenna.

FIGS. 5 and 6 illustrate the feed sub-assemblies 234, 236. The slot antenna 230 includes an outer or exterior surface 264 and an inner or interior surface 266. The slots 232 extend entirely through a thickness of the conductive sheet 250. The slots 232 include slots 232A, 232B, and 232C and slots 232D, 232E, and 232F. The slots 232A-232C are grouped together to provide a designated performance. The slots 232D-232F are grouped together to provide a designated performance. For example, the slots 232A-232C and the slots 232D-232F may be configured for different respective frequency bands.

The non-planar shape of the slot antenna 230 may form a channel 268 that is defined by the inner surface 266. The feed sub-assemblies 234, 236 are disposed within the channel 268 and coupled to the inner surface 266 of the slot antenna 230. For example, the feed sub-assemblies 234, 236 may be coupled to the slot antenna 230 using hardware (e.g., screws) and/or an adhesive.

As shown in FIG. 6, the feed sub-assemblies 234, 236 include substrates 270, 272, respectively, that form corresponding conductive pathways 271, 273. In an exemplary embodiment, the feed sub-assemblies 234, 236 are printed circuits. The substrates 270, 272 may be FR-4 or other dielectric material and comprise one or more dielectric layers. Each of the conductive pathways 271, 273 is configured to be terminated to a corresponding cable (e.g., coaxial cable). The conductive pathways 271, 273 may include vias (not shown) that extend through the substrates 270, 272, respectively. The conductive pathway 271 may be electrically coupled to opposite sides of the slot 232B, and the conductive pathway 273 may be electrically coupled to opposite sides of the slot 232E.

Figure 7:
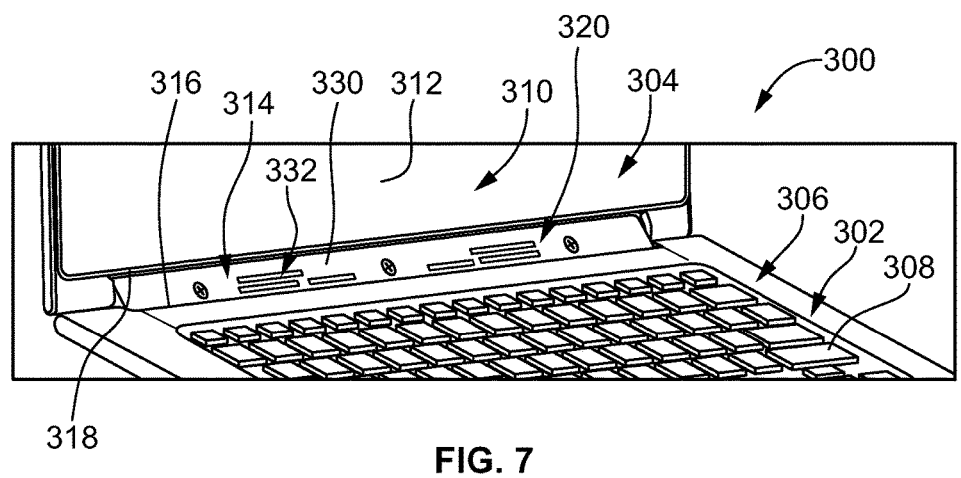
FIG. 7 is an enlarged front perspective view of a wireless communication device formed in accordance with an embodiment that includes a hinge assembly.
Figure 8:
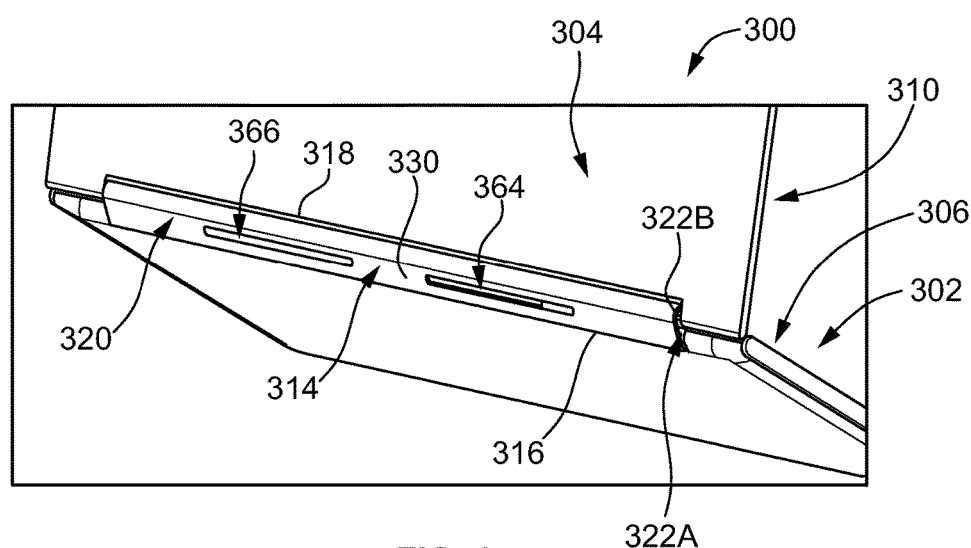
FIG. 8 is an enlarged back perspective view of the wireless communication device of FIG. 7.

FIGS. 7 and 8 are enlarged front and back perspective views, respectively, of a wireless device 300 formed in accordance with an embodiment. The wireless device 300 may be similar to the wireless device 200 (FIG. 3). For example, the wireless device 300 includes a first device section 302 and a second device section 304. The first device section 302 has an interactive side 306 that includes a keyboard 308 (FIG. 7). The second device section 304 has an interactive side 310 that includes a display 312 (FIG. 7). The display 312 may be a touchscreen.

The wireless device 300 also includes a hinge assembly 314 that joins the first and second device sections 302, 304 and permits the first and second device sections 302, 304 to move between an operating state (shown in FIGS. 7 and 8) and a closed state (not shown). The wireless device 300 may have multiple operating states, including a portable computer mode and a tablet mode. The first device section 302 includes a first edge 316, and the second device section 304 includes a second edge 318. In the illustrated embodiment, the hinge assembly 314 includes an antenna assembly 320 and axles 322A, 322B (FIG. 8). Each of the axles 322A, 322B coincides with respective axes of rotation 326, 328 (shown in FIG. 13). As such, the hinge assembly 314 may also be referred to as a floating hinge.

As shown in FIG. 7, the antenna assembly 320 includes a slot antenna 330 having a plurality of slots 332 that are sized and shaped to resonate at a designated frequency. As shown in FIG. 8, the slot antenna 330 includes a plurality of slots 364, 366. The slots 332 may be referred to as first slots, and the slots 364, 366 may be referred to as second slots. The slot antenna 330 may have a fixed position relative to the axles 322A, 322B. In an exemplary embodiment, the antenna assembly 320 is integrated with the hinge assembly 314 such that the antenna assembly 320 moves with the other elements of the hinge assembly 314.

Figure 9:
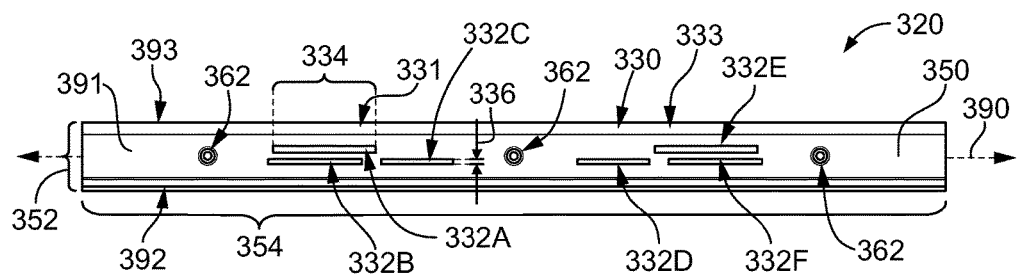
FIG. 9 is a front view of an antenna assembly formed in accordance with an embodiment that may be used with the wireless communication device of FIG. 7.

FIG. 9 is a front view of the antenna assembly 320. The slot antenna 330 includes a conductive sheet 350 that is shaped to surround a central axis 390 and define an antenna cavity or channel 360 (shown in FIG. 12). The conductive sheet 350 extends longitudinally along and parallel to the central axis 390. The conductive sheet 350 may form a first antenna section 391, opposing side sections 392, 393, and a second antenna section 394 (shown in FIG. 10). The first and second antenna sections 391, 394 oppose each other with the antenna cavity 360 extending therebetween. In other embodiments, the first and second antenna sections 391, 394 do not oppose each other.

The conductive sheet 350 is sized and shaped such that the antenna assembly 320 achieves a designated performance. The conductive sheet 350 may also be shaped to have a non-planar structure that enhances a stiffness of the hinge assembly 314 (FIG. 7). For example, the slot antenna 330 has a designated width 352, length 354, and height 356 (shown in FIG. 12). The width 352, the length 354, and the height 356 may be configured with the slots 332 such that the slot antenna 330 has designated electromagnetic properties. By way of example, the width 352 may be between 15 and 25 millimeters (mm), the length 254 may be between 200 and 300 mm, and the height 256 may be between 2 and 10 mm. However, embodiments set forth herein are not limited to these value ranges. In the illustrated embodiment, the width 352, the length 354, and the height 356 are essentially uniform throughout the slot antenna 230. In other embodiments, however, one or more of the dimensions may not be uniform. For example, a portion of the slot antenna may have a longer length than another portion of the slot antenna. Also shown, the conductive sheet 350 may include fastener holes 362 that are sized and shaped to receive hardware, such as a screw.

The plurality of slots 332 form a first group (or main group) 331 and a second group (or auxiliary group) 333. The first group 331 includes slots 332A, 332B, and 332C, and the second group 333 includes slots 332D, 332E, and 332F. Each of the slots 332 has a length 334 and a width 336 and is entirely defined by an inner edge of the conductive sheet 350. A resonant frequency of the corresponding slots 332 may be based on the lengths 334 and the widths 336. A bandwidth may be determined by the widths 336. The first and second groups 331, 333 may be configured to operate within different frequency bands. For example, the first group 331 may operate within the 2.4 GHz frequency band, and the second group 333 may operate within the 5.4 GHz frequency band.

Figure 10:
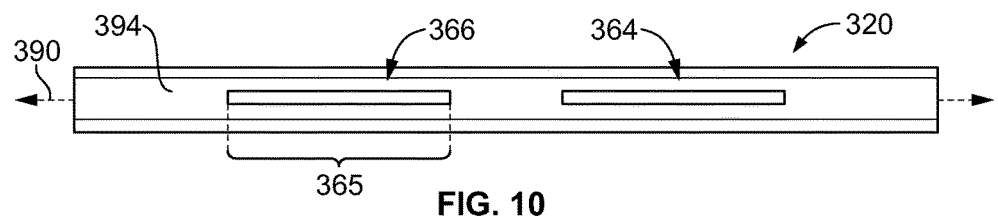
FIG. 10 is a backside view of the antenna assembly of FIG. 7.

FIG. 10 is a backside view of the antenna assembly 320. As shown, the conductive sheet 350 includes slots 364, 366 formed within the second antenna section 394. The slot 364 generally opposes the slots 332A-332C with the antenna cavity 360 (FIG. 12) therebetween, and the slot 366 generally opposes the slots 332D-332F with the antenna cavity 360 therebetween. In an exemplary embodiment, the slots 364, 366 are sized to improve performance of the antenna assembly 320. For example, the slots 364, 366 may have corresponding lengths 365 that are greater than the lengths 334. In other embodiments, however, the slots 364, 366 may be configured to resonate at one or more designated frequency bands.

Figure 11:
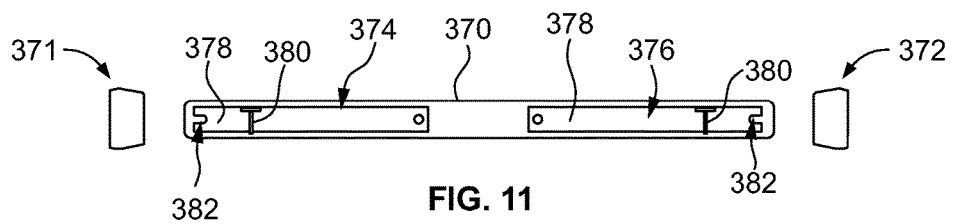
FIG. 11 illustrates interior components of the antenna assembly of FIG. 7.
Figure 12:
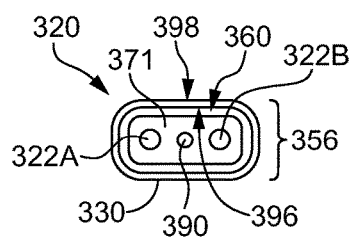
FIG. 12 is an end view of the antenna assembly of FIG. 7.

FIG. 11 illustrates interior components of the antenna assembly 320 (FIG. 7), including a hinge support 370, first and second cavity caps 371, 372, and feed sub-assemblies 374, 376. The feed sub-assemblies 374, 376 are configured to be disposed within the antenna cavity 360 (FIG. 12). The feed sub-assemblies 374, 376 each include a printed circuit 378 having conductive pathways or traces 380 that are configured to operably couple to corresponding slots 332 (FIG. 9). The printed circuits 378 also include thru-holes 382 for receiving the hardware that is inserted through the fastener holes 362 (FIG. 9). The hinge support 370 is configured to receive and hold the axles 322A, 322B (FIG. 8). The hinge support 370 may be disposed within the antenna cavity 360 (FIG. 12) and, optionally, may couple to and hold the feed sub-assemblies 374, 376. The hinge support 370 may comprise, for example, a moldable material. In other embodiments, the hinge support 370 is a stamped-and-formed frame that is shaped to engage and hold the axles 322A, 322B.

FIG. 12 is an end view of the antenna assembly 320 and illustrates the first cavity cap 371. The conductive sheet 350 has an interior surface 396 and an exterior surface 398. The interior surface 396 faces the central axis 390 and defines the antenna cavity 360. The exterior surface 398 faces radially away from the central axis 390. As shown, a cross-sectional shape of the slot antenna 330 may be substantially oval-shaped. In other embodiments, the cross-sectional shape is circular or polygonal. For example, the cross-sectional shape may be rectangular.

The first cavity cap 371 and the second cavity cap 372 (FIG. 10) are oriented orthogonal (or perpendicular) to the central axis 390. The first and second cavity caps 371, 372 are configured to enclose at least a portion of the antenna cavity 360, which may improve performance of the antenna assembly 320. The first and second cavity caps 371, 372 may oppose each other with the hinge support 370 being located therebetween. In the illustrated embodiment, each of the first and second cavity caps 371, 372 is disposed a depth within the antenna cavity 360. In other embodiments, however, the first and/or the second cavity caps 371, 372 may cover a corresponding end of the slot antenna 330. As shown, the axles 322A, 322B may extend through the first cavity cap 371.

Figure 13:
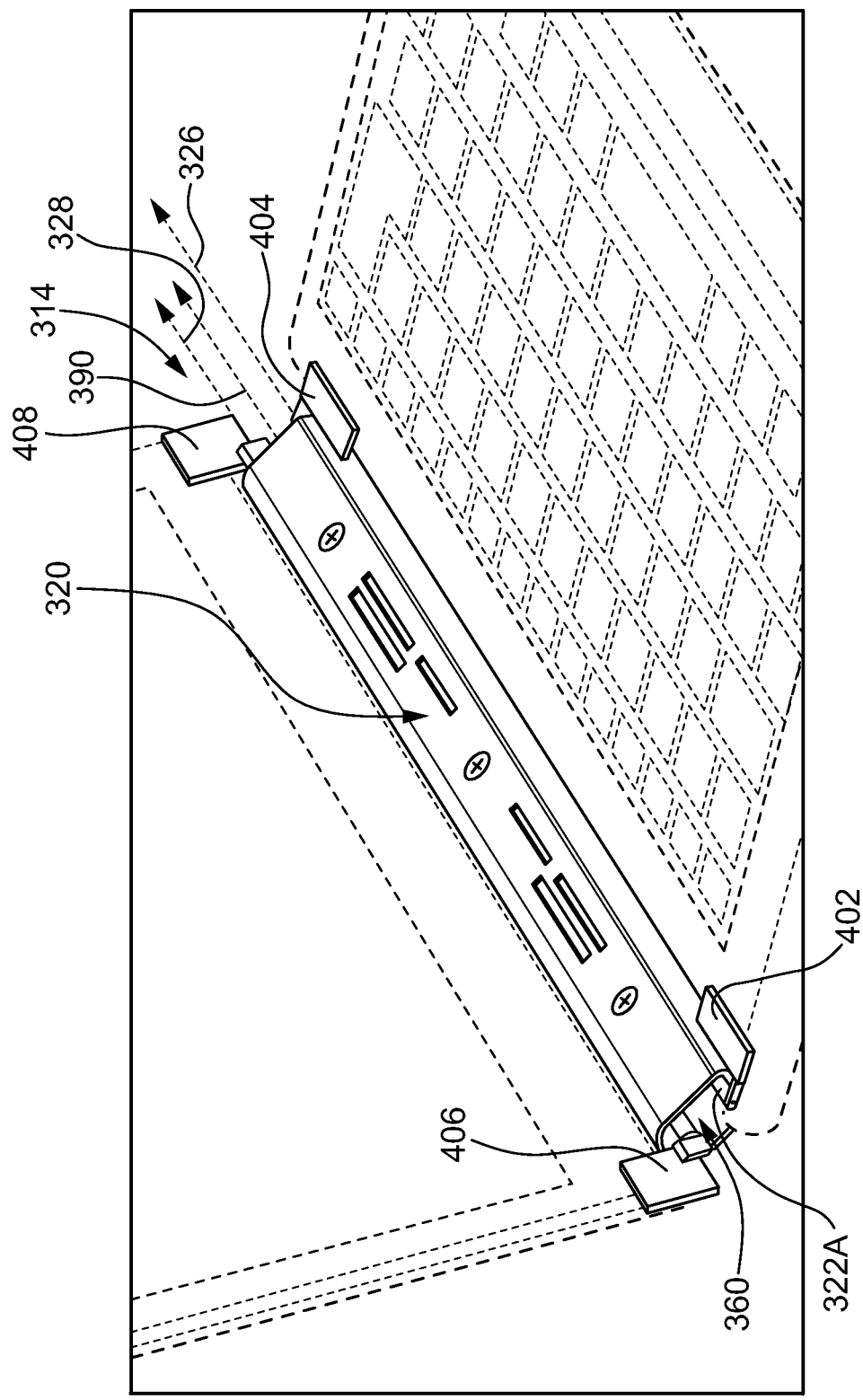
FIG. 13 is an enlarged perspective view of the wireless communication device of FIG. 7 that highlights the hinge assembly.

FIG. 13 is an enlarged perspective view of the wireless device 300 and illustrates the hinge assembly 314 and the integrated antenna assembly 320 in greater detail. As shown, the axle 322A is coupled to a first plate assembly 402 at one end and a second plate assembly 404 at an opposite end of the axle 322A. The first and second plate assemblies 402, 404 are secured to the first device section 302 (represented by dashed lines). Similarly, the axle 322B is coupled to a first plate assembly 406 at one end and a second plate assembly 408 at an opposite end of the axle 322B. The first and second plate assemblies 406, 408 are secured to the second device section 304 (represented by dashed lines). In the illustrated embodiment, the axles 322A, 322B extend through the antenna cavity 360 and the hinge assembly 314. The axes 326, 328 extend through the axles 322A, 322B, respectively, and parallel to the central axis 390. The axles 322A, 322B may rotate within the antenna cavity 360 as the corresponding device section is moved.

Figure 14:
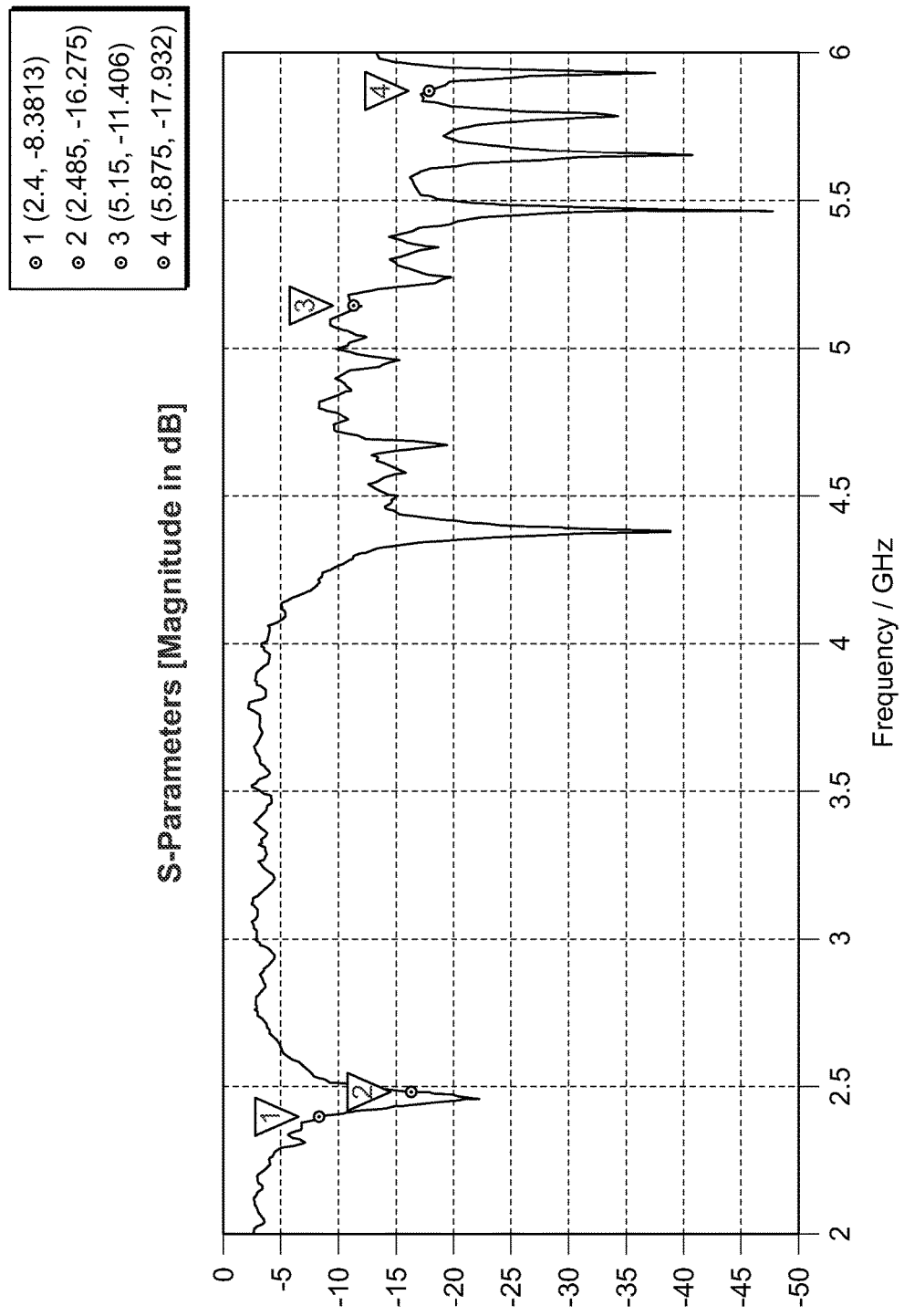
FIG. 14 is a graph illustrating simulated return loss of an antenna assembly formed in accordance with an embodiment.

FIG. 14 is a graph illustrating return loss by an antenna assembly that was formed in accordance with an embodiment. The graph is based on simulated data. More specifically, an antenna assembly, such as the antenna assembly 220 or 320, was simulated through a range of frequencies (2 GHz to 6 GHz). As shown, embodiments provide an antenna assembly that is capable of performing effectively within multiple frequency bands. The range of frequencies may be applicable to a wireless local area network (WLAN) product that is based on the Institute of Electrical and Electronics Engineers (IEEE) 802.11 standards. However, embodiments set forth herein may be applicable to other frequency bands, such as those described above.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. An antenna assembly comprising:
   a conductive sheet that extends longitudinally along a central axis and is shaped to surround the central axis, the conductive sheet having an interior surface that faces the central axis and defines an antenna cavity, the conductive sheet including a first slot that is configured to resonate at a designated frequency;
   a feed sub-assembly positioned within the antenna cavity and operably coupled to the first slot, the feed sub-assembly including a conductive pathway that extends across the first slot;
   wherein the conductive sheet also includes a second slot that is located generally opposite the first slot with the antenna cavity therebetween.

2. A wireless communication device comprising:
   a first device section having a processor and an input device that is operably connected to the processor, the input device configured to receive inputs from a user, the first device section having a first edge;
   a second device section including circuitry that is communicatively coupled to the processor, the second device section having a second edge; and
   a floating hinge that includes the antenna assembly of claim 1, the floating hinge joining the first and second edges and permitting the first and second device sections to move between a closed state and an operating state, the floating hinge and the first device section being rotatable about a first axis of rotation that extends through the floating hinge, the floating hinge and the second device section being rotatable about a second axis of rotation that extends through the floating hinge.

3. The wireless communication device of claim 2, wherein the second device section has an interactive side that includes a touchscreen and a housing side, the interactive and housing sides facing in opposite directions, wherein the floating hinge permits the first and second device sections to be folded into a tablet mode in which the first and second device sections are positioned side-by-side and the touchscreen is exposed to an exterior of the wireless communication device.

4. The wireless communication device of claim 3, wherein the floating hinge forms a device edge of the wireless communication device when in the tablet mode.

5. The wireless communication device of claim 2, wherein the floating hinge includes a hinge support and first and second axles that are coupled to or formed by the hinge support, the slot antenna having a fixed position relative to the hinge support and the first and second axles.

6. The wireless communication device of claim 2, wherein the floating hinge includes a first axle that couples the first device section to the floating hinge and has the first axis of rotation extending therethrough, the wireless communication device further comprising a communication line that extends through the first axle or immediately adjacent to the first axle, the communication line being electrically coupled to the slot antenna.

7. The wireless communication device of claim 2, wherein the conductive sheet is shaped to form an antenna section and a leg section that is oriented perpendicular to the antenna section.

8. The antenna assembly of claim 1, wherein the second slot is configured to resonate at a different designated frequency.

9. The antenna assembly of claim 1, wherein the second slot has a length that is greater than a length of the first slot.

10. The antenna assembly of claim 1, wherein the feed sub-assembly includes a printed circuit having the conductive pathway.

11. The antenna assembly of claim 1, wherein the second slot is sized and shaped to improve performance of the antenna assembly relative to a performance of the antenna assembly without the second slot.

12. The antenna assembly of claim 1, wherein the conductive sheet includes a first antenna section, side sections that oppose each other, and a second antenna section, the first and second antenna sections opposing each other with the antenna cavity extending therebetween.

13. An antenna assembly comprising:
a conductive sheet that extends longitudinally along a central axis and is shaped to surround the central axis, the conductive sheet having an interior surface that faces the central axis and defines an antenna cavity, the conductive sheet including a first slot that is configured to resonate at a designated frequency;
a feed sub-assembly positioned within the antenna cavity and operably coupled to the first slot, the feed sub-assembly including a conductive pathway that extends across the first slot;
wherein the conductive sheet also includes a second slot that is located generally opposite the first slot with the antenna cavity therebetween; and
a cavity cap that is disposed within the antenna cavity or across a cavity opening defined by the conductive sheet, the cavity cap being oriented orthogonal to the central axis.

14. The antenna assembly of claim 13, wherein the cavity cap is a first cavity cap and the cavity opening is a first cavity opening, the antenna assembly further comprising a second cavity cap that is disposed within the antenna cavity or across a second cavity opening that is defined by the conductive sheet, the second cavity cap being oriented orthogonal to the central axis.

15. The antenna assembly of claim 13, wherein the cavity cap is located a depth within the antenna cavity from an end of the antenna assembly.

16. The antenna assembly of claim 13, further comprising an axle that extends through the antenna cavity and the cavity cap, the conductive sheet configured to rotate about an axis of rotation that extends through the axle.

17. A hinge assembly comprising:
a conductive sheet that extends longitudinally along a central axis and is shaped to surround the central axis, the conductive sheet having an interior surface that faces the central axis and defines an antenna cavity, the conductive sheet including a first slot that is configured to resonate at a designated frequency; and
a feed sub-assembly positioned within the antenna cavity and operably coupled to the first slot, the feed sub-assembly including a conductive pathway that extends across the first slot;
wherein the conductive sheet also includes a second slot that is located generally opposite the first slot with the antenna cavity therebetween; and
first and second axles that extend parallel to the central axis, the hinge assembly configured to rotate about a first axis of rotation that extends through the first axle and a second axis of rotation that extends through the second axle.

18. The hinge assembly of claim 17, further comprising a hinge support that is coupled to or forms the first and second axles, the conductive sheet having a fixed position relative to the hinge support and the first and second axles.

19. The hinge assembly of claim 17, wherein the hinge support is disposed within the antenna cavity and has a fixed position relative to the feed sub-assembly.

20. An antenna assembly comprising:
a conductive sheet that extends longitudinally along a central axis and is shaped to surround the central axis, the conductive sheet having an interior surface that faces the central axis and defines an antenna cavity, the conductive sheet including a first slot that is configured to resonate at a designated frequency;
a feed sub-assembly positioned within the antenna cavity and operably coupled to the first slot, the feed sub-assembly including a conductive pathway that extends across the first slot;
wherein the conductive sheet also includes a second slot that is located generally opposite the first slot with the antenna cavity therebetween;
wherein the first slot is one slot of an array of first slots, at least two of the first slots configured to resonate at a different respective frequency.

* * * * *